Feb. 25, 1964    L. F. SHABRAM    3,122,466
APPARATUS FOR CONTINUOUSLY FORMING
EDGE-UNITED LAMINAR ARTICLES
Original Filed April 18, 1958    5 Sheets-Sheet 1

INVENTOR.
Lyle F. Shabram
BY
Atty.

INVENTOR.
Lyle F. Shabram

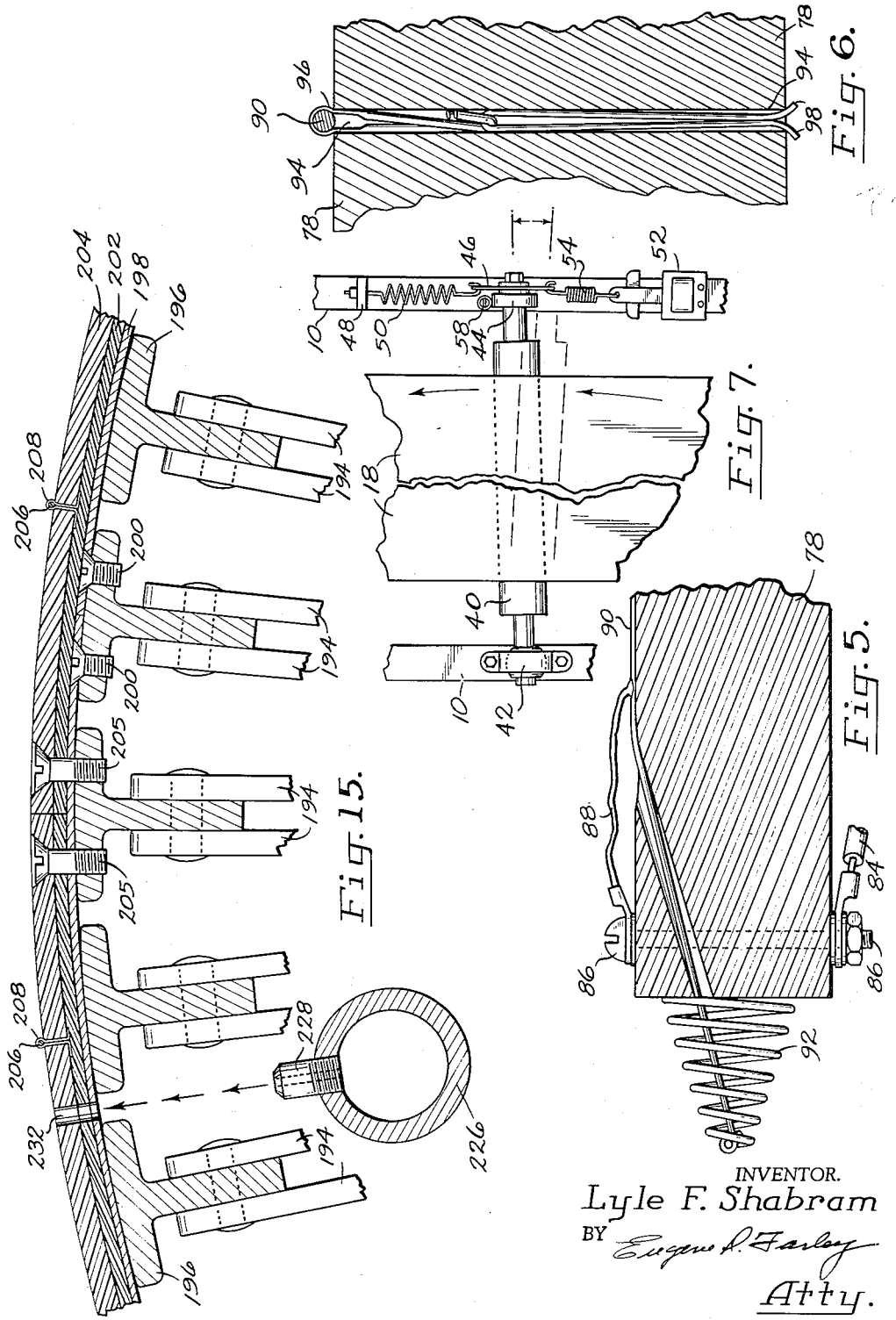

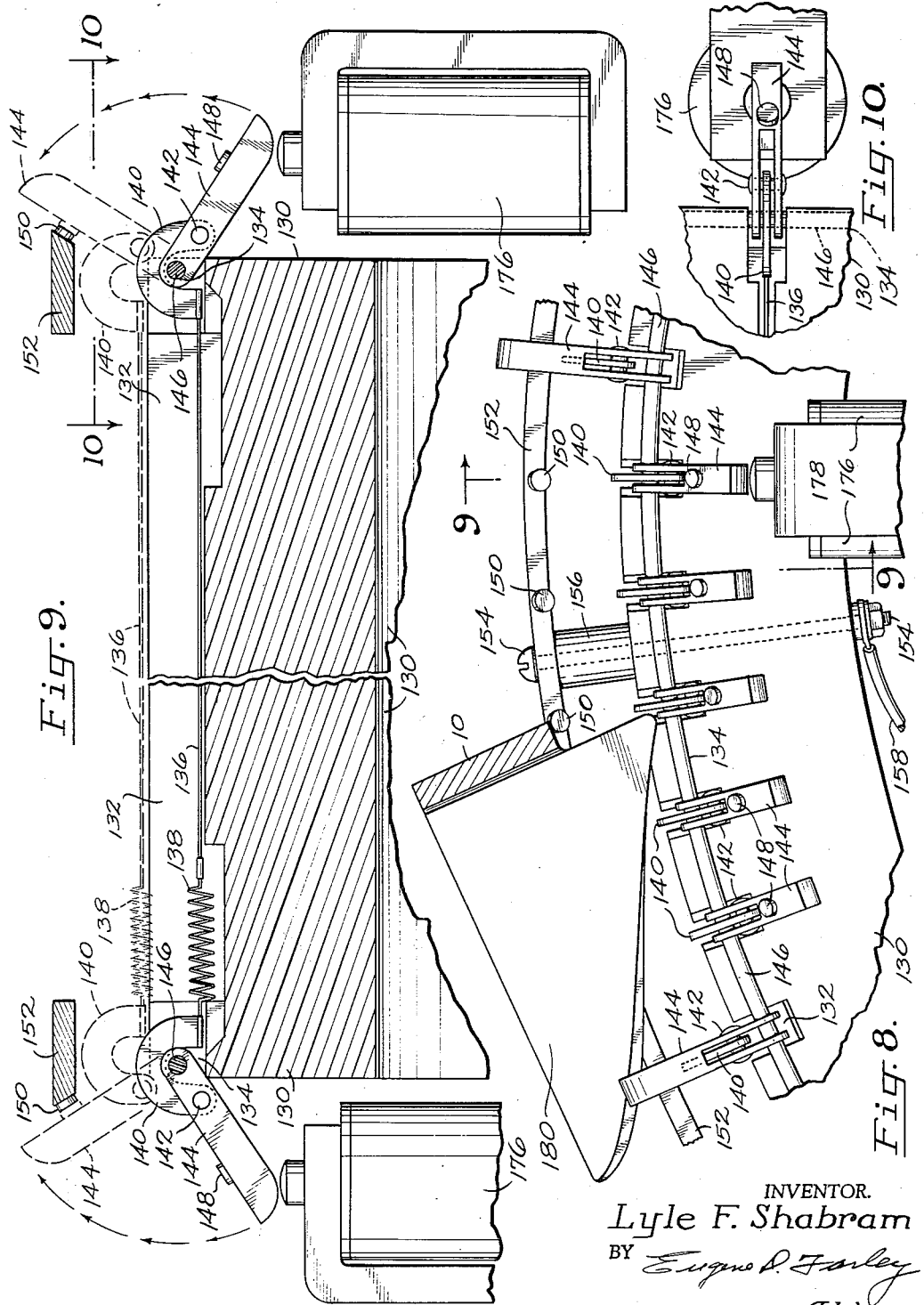

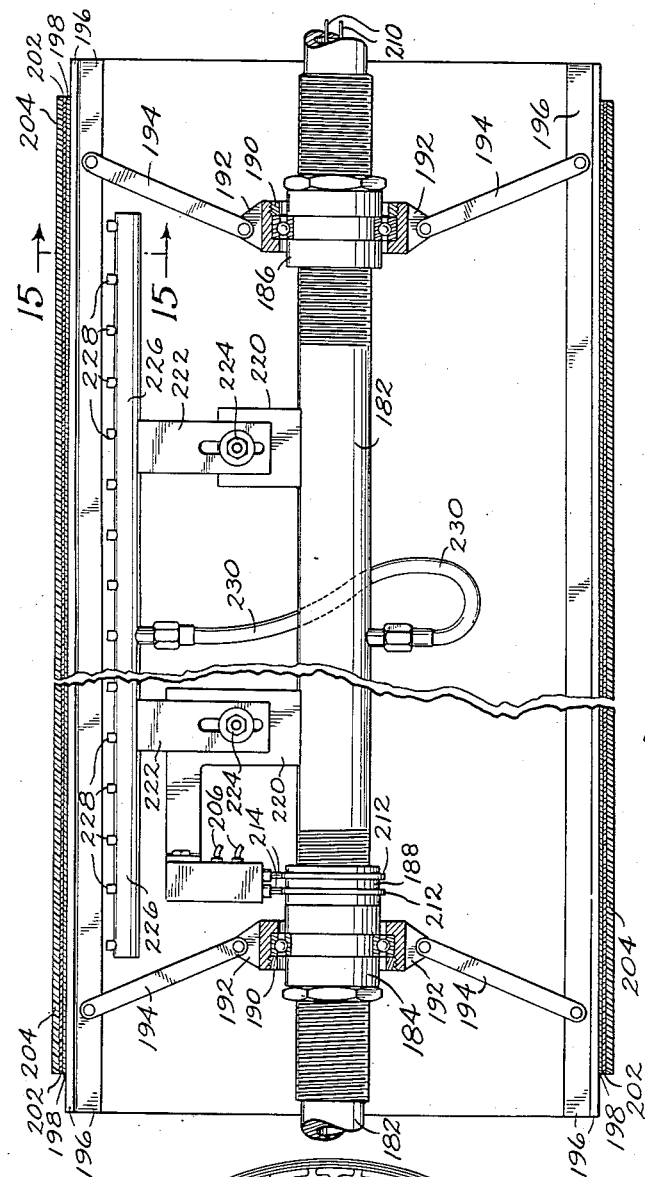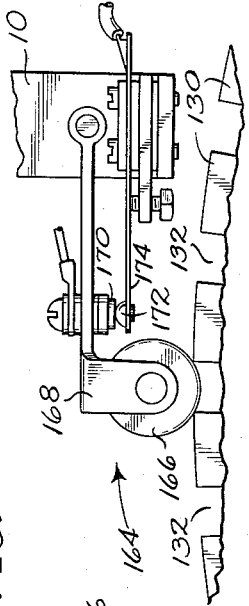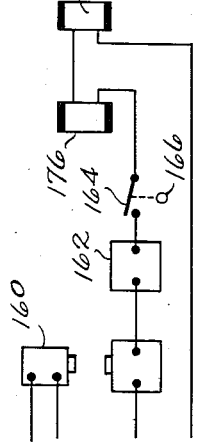

United States Patent Office 3,122,466
Patented Feb. 25, 1964

3,122,466
APPARATUS FOR CONTINUOUSLY FORMING
EDGE-UNITED LAMINAR ARTICLES
Lyle F. Shabram, Danville, Calif., assignor, by mesne
assignments, to Consolidated Thermoplastics Company,
Stamford, Conn., a corporation of Delaware
Original application Apr. 18, 1958, Ser. No. 729,350.
Divided and this application Nov. 17, 1961, Ser. No.
155,383
7 Claims. (Cl. 156—515)

This invention relates to a method of forming edge-united laminar articles and to apparatus therefor.

It is a general object of this invention to provide method and apparatus for making laminar articles by edge-uniting overlying sheets of heat-alterable plastic material, particularly overlying sheets or continuous webs or tubes of thermoplastic material.

It is another object of this invention to provide method and apparatus for making a diversity of edge-united laminar articles of regular or irregular contour.

Still another object of this invention is the provision of apparatus for making edge-united laminar articles which is easily adjustable as required to make articles of different shape, size and contour without substantial modification of the apparatus.

Still another object of this invention is the provision of method and apparatus for making edge-united laminar articles wherein the work is sealed and severed simultaneously.

Still another object of this invention is the provision of method and apparatus which are suitable for use in the fabrication of printed plastic bags and other articles bearing printed matter.

Still another object of this invention is the provision of method and apparatus for making edge-united laminar articles in which the finished articles may be trimmed and the trimmings separated from the articles and conveyed away in a continuous operation.

Still another object of this invention is the provision of method and apparatus for making edge-united laminar articles wherein a backing sheet of paper or other material serves as a conveyor for the articles as well as a wrapping therefor if desired.

Still another object of this invention is the provision of method and apparatus for making edge-united laminar articles which are designed to produce finished articles of high quality at a high production rate.

The manner in which the foregoing and other objects of this invention are accomplished will be apparent from the following specification and claims considered together with the drawings wherein like numerals of reference indicate like parts, and wherein:

FIGS. 5 and 6 are detail sectional views indicating the manner of attaching the electrically energized elements employed in the apparatus of FIGS. 1–3;

FIG. 7 is a detail plan view of a belt straightening unit employed in the apparatus of FIGS. 1–3, looking in the direction of the arrows of line 7—7 of FIG. 1;

Figure 1:
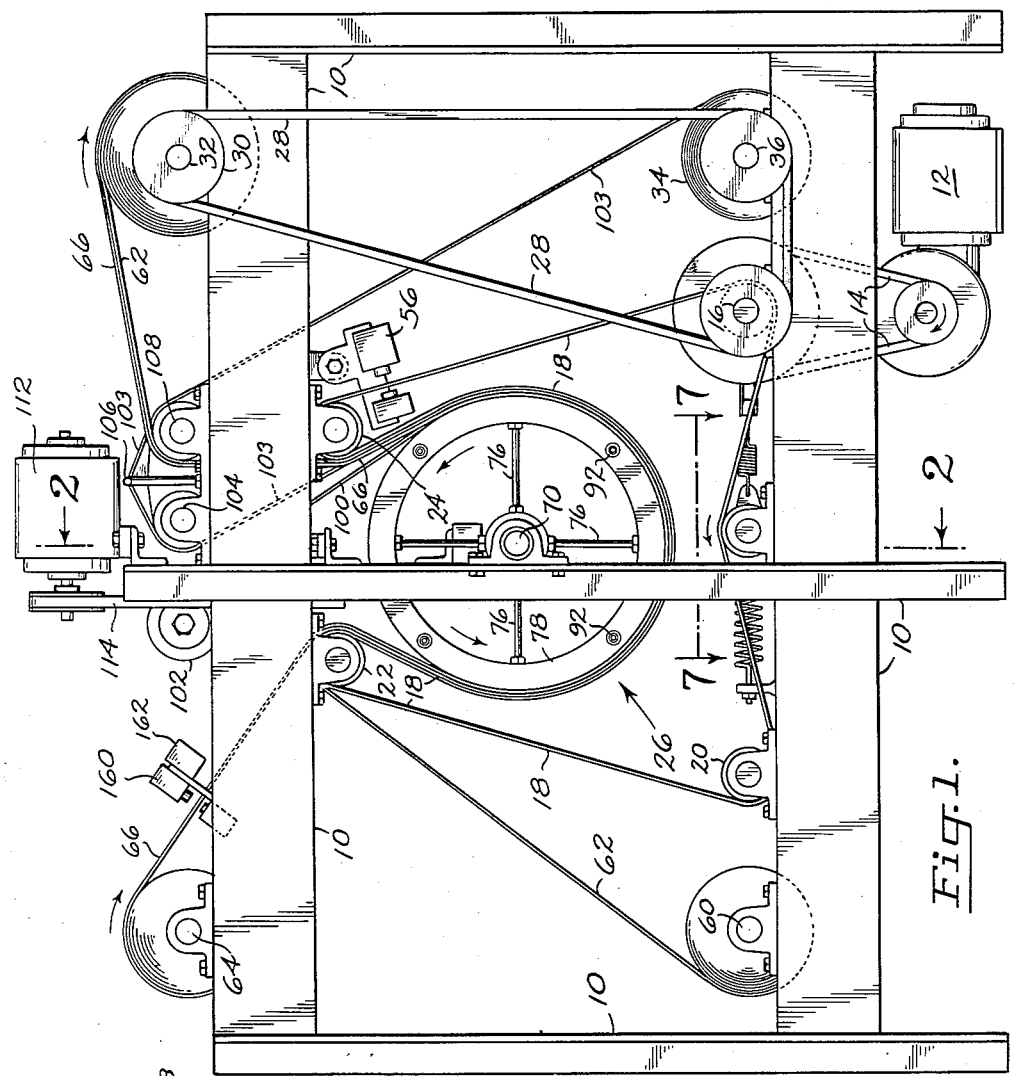
FIG. 1 is a view in side elevation of the herein described apparatus.

FIGS. 8, 9, 10 and 11 are detail views illustrating alternate means for mounting and operating in the presently described apparatus electric resistance wires for sealing and severing plastic tubes and overlaid sheets, FIG. 9 being a sectional view taken along line 9—9 of FIG. 8 and FIG. 10 being a plan view looking in the direction of the arrows of line 10—10 of FIG. 9;

FIG. 12 is a schematic diagram of an electric circuit for use in the apparatus of FIGS. 8–11; and FIGS. 13, 14 and 15 are detail views illustrating still another embodiment of the invention for forming edge-united laminar articles of selected shape and dimensions, FIG. 13 being in front elevation, FIG. 14 in end elevation, and FIG. 15 being in section taken along line 15—15 of FIG. 13.

*The Apparatus of FIGURES 1–7*

Referring first to the apparatus of FIGURES 1–7, inclusive, which illustrate the basic unit of the herein described invention:

The apparatus is mounted on a suitable frame 10 and driven by means of a motor 12. The motor is coupled through belt 14 to a rotatably mounted drive roll 16.

The drive roll mounts a drive belt 18 which may comprise, for example, a non-stretching rubber belt having a base ply of high-temperature nylon. The belt is reeved about idler rolls 20, 22, 24 as well as about three quarters of the diameter of a die roll 26 of substantial diameter. Drive roll 16 also mounts a belt 28 which engages a slip clutch 30 on the shaft of a first winding roll 32, as well as a slip clutch 34 on the shaft of a second winding roll 36.

Belt straightening means are associated with drive belt 18, as is illustrated particularly in FIGS. 1 and 7.

Thus the belt passes over a biased roll 40, the shaft on one end of which is rotatably mounted in bearing 42 on frame 10. The shaft on the other end of the roll is journaled in bearing 44 supported by floating plate 46. One side of the plate is connected to a standard 48 through spring 50. The other end of the plate is connected to a solenoid 52 through spring 54, which possesses a higher degree of stiffness than does spring 50.

Solenoid 52 is controlled by means of an electric eye 56 (FIG. 1) positioned in such a manner that its beam is intercepted by the edge of belt 18 as the belt moves from one side of the roll to the other. Thus if the electric eye is positioned adjacent the far edge of the belt as viewed in FIG. 1, and roll 40 is in the full line position of FIG. 7, the belt normally intercepts the beam and the arm of solenoid 52 is extended.

However, as the belt shifts toward the left because of the action of biased roll 40, a point is reached at which the beam is completed. Thereupon solenoid 52 is energized, its arm retracted, and roll 40 shifted to the dotted line position of FIG. 7. Thereupon the belt will shift to the right until the beam again is intercepted. This will result in the extension of the arm of solenoid 52 so that the roll again assumes the full line position of FIG. 7, being stationed against a stop 58. In this manner the belt is centralized so that it may fulfill its intended purpose of conveying and backing up superimposed layers of plastic material and paper for the operation of die roll 26.

The paper is supplied to the die roll from a rotatably mounted roll 60. It may comprise, for example, a wide sheet of thin, water-absorbent but strong paper useful as a backing, as a conveyor for the formed plastic articles, and as a disposable tissue which may assist in the end use of the articles.

Multilayer plastic material is fed to the apparatus from a rotatably mounted roll 64 which feeds continuously around die roll 26 intermediate the peripheral surface of the latter roll and paper sheet 62. As has been indicated above, the plastic material preferably comprises superimposed webs, tubes or side-folded webs of thermoplastic material such as cellulose acetate, cellulose butyrate, polyvinyl chloride, polyvinyl acetate, polyethylene, etc.

The thermoplastic material may be used as overlying webs which are independent of each other, or as a single web folded over to form a double layer. In the latter case the fold in the material will form a pre-united edge of the final product, as the bottom of a plastic bag, the side edges of which are sealed together by the present apparatus.

In the alternative, the thermoplastic feed may comprise a flat tube. In this case, a product sealed on all four sides may be formed which then may be severed centrally to form two finished articles such as a pair of plastic bags.

It is intended that the word sheet, as used herein, is to be generic with respect to the several continuous forms of multilayer thermoplastic material, and is not intended to be a word of limitation employing a single layer or a segment of a continuous form of material.

Figure 3:
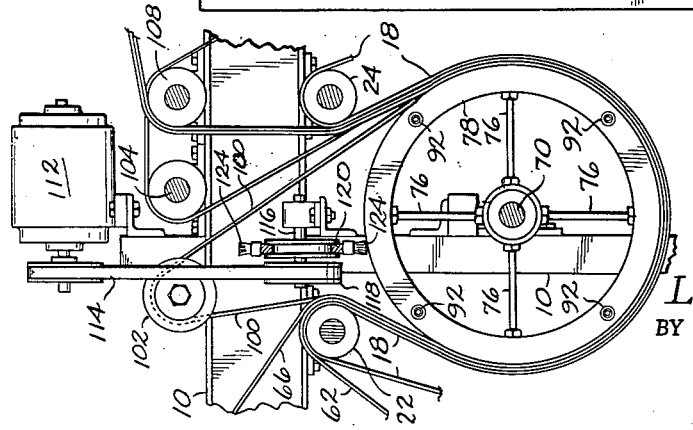
FIG. 3 is a sectional view taken along line 3—3 of FIG. 2.
Figure 2:
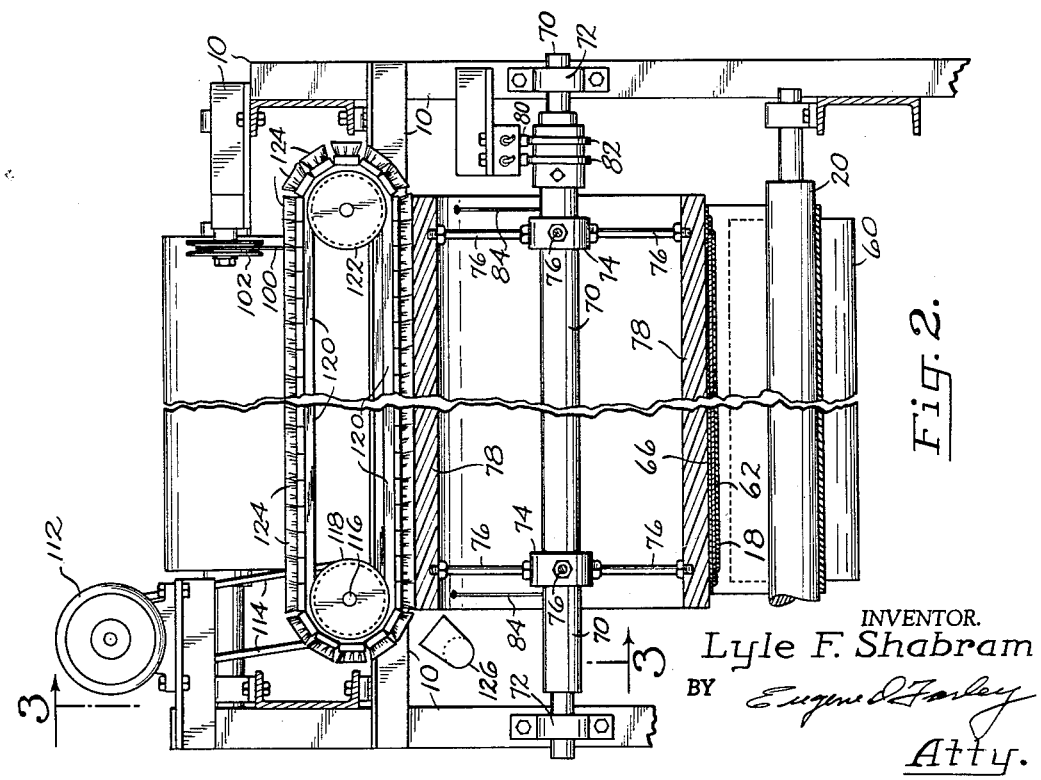
FIG. 2 is a transverse sectional view taken along line 2—2 of FIG. 1.

The construction of die roll 26 about which paper backing sheet 62 and plastic sheet 66 are guided is particularly apparent from FIGS. 2 and 3. The roll is mounted on a shaft 70 journaled in bearings 72. Spaced collars 74 are fixed to the shaft and mount a plurality of spaced, radial rods 76. The rods in turn support a cylinder 78 of transite or similar electrically insulating material.

Means are provided on the peripheral surface of cylinder 78 for simultaneously severing overlying sheets of alterable material passing about the cylinder and sealing the severed edges. Such means are illustrated particularly in FIGS. 2, 5 and 6.

Electric current is transmitted through brushes 80 to slip rings 82 carried by shaft 70. The current then passes through connecting wires 84, bolts 86 and connectors 88 to electric resistance wire 90. The latter is arranged in a suitable pattern across the periphery of the cylinder, for example, in the pattern of gloves illustrated in FIG. 4. This pattern is formed of a single continuous wire maintained under tension by attaching it at selected points to coil springs 92 which bear against the end walls of the cylinder.

The wire is maintained in the desired pattern by fastening elements illustrated in FIG. 6. Cylinder 78 is drilled to provide a plurality of radial openings 94 at selected points along the path to be followed by the wire. A fastening wire 96 then is looped about the resistance wire and its terminal portions doubled back in the indicated manner to form a hook. Another looped wire segment is inserted through opening 94, from the inside, and looped over the hooked portions of the wire 96. The latter is drawn into the opening until the resistance wire is secured firmly against the cylinder. The ends of wire 98 then are bent out and clipped off, holding the resistance wire in place.

Resistance wire 90 is maintained at a temperature sufficient to melt the portions of overlying plastic sheets 66 which it contacts, thereby severing the sheets and simultaneously sealing the severed edges. Where, as in the illustrated embodiment, the severing lines extend substantially completely across the sheet, means may be afforded for interrupting the lines so that the articles are held together by unsevered fragments of plastic. Such means are illustrated in FIGS. 1 and 2.

A continuous, narrow tape or string 100 is mounted on an idler roll 102 and extends around cylinder 78 adjacent one end thereof. It is driven by rotation of the cylinder and is interposed between the surface of the latter and the adjacent plastic. Hence there is left an unmelted, unsealed area having substantially the width of the tape or string. This interconnects the finished articles so that they do not become detached from each other. However, it is readily severed when the articles are to be packaged or used.

Means are also provided for separating any trim 103 which may be formed together with the articles. To this end an idler roll 104, a horizontal bar 106 and a second idler roll 108 are mounted on the frame of the apparatus. The trim, for example the areas of plastic between the fingers of the gloves illustrated in FIG. 4, then is separated from the gloves and threaded over roll 104, across bar 106, over roll 108, and down to roll 36 which is driven from belt 28 through slip clutch 34. Accordingly, as the formed plastic articles and conveying paper sheet are wound on reel 30, the trim is wound on reel 36.

Any scrap material which may remain on die roll 26 is removerd by a brush assembly which serves the ancillary purpose of applying silicones or other release compositions to the surface of the roll. The brush assembly is illustrated in FIGS. 2 and 3.

A motor 112 drives a belt 114 which powers a rotatably mounted drive shaft 116. Keyed to the drive shaft is a pulley 118 which mounts and drives one end of an endless belt 120. The other end of the belt is mounted on an idler pulley 122. The belt carries a plurality of brushes 124 juxtaposed end to end and positioned in such a manner that they engage the upper surface of cylinder 78. Thus as they wipe across the surface, they remove any plastic fragments which remain on it and at the same time may apply a suitable release coating so that the plastic will not stick to the surface of the cylinder. The fragments of material which are brushed off the cylinder may be collected by suitable means, for example, by means of a vacuum nozzle 126 (FIG. 2).

The manner of operation of the embodiment of FIGS. 1–7 inclusive is as follows:

Motor 12 drives endless belts 18 and 28 continuously. The former belt frictionally drives die roll 26, while the latter drives article winding reel 32 and trim winding reel 36. A paper sheet 62, underlying or overlying double plastic sheets 66, is threaded around pulley 22, and between belt 18 and the surface of die roll 26.

As the plastic passes adjacent the periphery of the die roll, hot wires 90 melt the plastic, severing it and at the same time sealing the severed edges. This effect occurs whether the paper is interposed between the roll and the plastic or not, the chief difference being in the time required. In general, the die roll moves slowly so that the plastic may be severed using a relatively low wire temperature. As a consequence, time is afforded for proper control of the process.

During operation of the die roll, a string or narrow tape 100 is interposed between the roll surface and the plastic so that there remains a continuous plastic strip the length of the sheet. This ties together the finished articles.

As the articles on their paper backing leave the die roll, they pass over idler roll 108 and are wound up on reel 32. The trim which may remain is guided over rolls 104, bar 106 and roll 108 down onto winding reel 34 where it is accumulated separately.

Thus the plastic and paper sheets are maintained continuously under tension throughout the entire operation. Also, the die operates on the plastic against a resilient backing comprising the paper sheet and the conveyor belt which has some inherent resiliency. Furthermore, the plastic sheet is worked to a certain degree by being formed around the die roll and then by being formed in a reverse direction around idler roll 108. As a consequence, the plastic is severed cleanly and the severed edges are effectively sealed.

*The Apparatus of FIGURES 8–12*

The apparatus of FIGS. 8–12 is designed for use particularly in the manufacture of plastic bags and the like. It provides a solution to the problem of manufacturing such articles in predetermined widths, using a die roll of fixed diameter, even though the circumference of the roll is not an even multiple of the selected width.

The general arrangement, drive, and feeding means employed in the apparatus of FIGS. 8–12 are substantially the same as those illustrated above in connection with FIGS. 1–7. The die roll assembly, however, includes a cylinder 130 of electrically insulating material having across its outer surface a plurality of spaced, parallel longitudinal slots 132. An annular recess 134 interconnecting the ends of all of the slots extends around one margin of the cylinder.

A plurality of electrical resistance wires 136 are positioned one in each of the slots. These wires correspond to wire 90 of the previously described embodiment in that they serve to sever and seal the edges of overlying sheets traversing the cylinder.

Means are provided for shifting selected ones of wires 136 between retracted inoperative positions, represented by the full lines in FIG. 9, and advanced operative positions, represented by the dotted lines of that figure. To this end, each of the wires, maintained taut by spring 138, is connected at each of its ends to an arcuate support member 140. The outer end of each of the arcuate support members is pivotally connected by means of pin 142 to an intermediate point on a finger 144.

The inner end of each finger is pivotally connected to an insulating rod 146 disposed in annular recess 134. The outer end of each finger carries a contact point 148 positioned to contact points 150 on a bus bar 152. The latter is supported on posts 154 which are spaced from the periphery of cylinder 130 by insulators 156 and are connected at their inner ends to wires 158. Support members 140, contact fingers 144, bus bar 152, and posts 154 all are of electrically conducting material. Accordingly, selected ones of wires 136 may be interconnected in series circuit relationship with each other when the wires are elevated and contact fingers 144 are in contact with bus bar 152, completing the electric circuit to the power source.

The electric circuit employed for elevating selected ones of wires 136 into operative position as required to form bags or other articles of the predetermined width is illustrated in FIGS. 1, 11 and 12. An electric eye 160 scans sheets 66 for printed insignia. When such insignia interrupt the beam, an impulse is stored in timer 162. The latter is in series with a roller switch 164.

As is indicated in FIG. 11, this switch includes a roller 166 which traverses the periphery of cylinder 130. The roller is rotatably mounted on an arm 168 which in turn is pivoted to frame 10. The arm supports a contact point 170 positioned for engagement with a contact point 172 on a resilient arm 174 also mounted on frame member 10. As roller 166 dips into recesses 132, contact is made between the contact points, thereby closing the electric circuit and releasing the impulse stored in timer 162.

Completion of the circuit energizes a pair of solenoids 176. The solenoids act outwardly, moving fingers 144 until the contact points thereon contact the points on bus bar 152. This completes a circuit through wires 136 which accordingly are energized and poised, ready to contact the overlying plastic sheets at the precise instant when the printing thereon is correctly positioned.

Means also are provided for depressing wires 136 after each severing and sealing operation. A cam 180 (FIG. 8) is mounted on frame 10 and positioned in such a manner that its cam surface contacts the outer ends of fingers 144 when they are elevated. This returns them to their retracted position wherein wires 136 rest in recesses 132.

The operation of the apparatus of FIGS. 8–12 is as follows:

Overlying sheets of plastic backed up by paper sheets are passed around the periphery of die cylinder 130 in the manner illustrated in FIG. 1. The surface of the plastic sheets is printed with selected insignia, for example, advertising material of the desired character.

The sheets are scanned by electric eye 160 which operates when its beam is intercepted by the printing on the sheets. An impulse thereupon is stored in timer 162 which is discharged upon closure of roller switch 164 (FIGS. 11 and 12). A circuit thereupon is completed through solenoids 176 which elevate the corresponding one of wires 136 by the toggle action of solenoid-operated fingers 144.

Electrical contact thus is made between the fingers and bus bar 152, energizing the elevated wire so that it will cut and seal the overlying plastic sheets at precisely the proper instant for centering the printed matter and producing a bag or other article of the desired width.

The fingers and the wires connected thereto are depressed by cam 180 to their inoperative station after each operation. The operation then is repeated, a selected wire 136 being elevated each time an impulse is received from electric eye 160. In this manner it is possible to produce bags or other articles of any desired width on a die roll of fixed diameter, even though the circumference of the die roll may not be an even multiple of the desired width.

*The Apparatus of Figures 13–15*

The apparatus of FIGS. 13–15 illustrates another means for producing sealed articles of variable pattern and dimensions. Like the forms of the invention described above, it includes a die roll assembly driven and fed in the manner illustrated, for example, in FIG. 1. However, the roll is expandable as required to provide one having a circumference dimensioned to accommodate articles of the predetermined width.

The die roll is mounted on a shaft 182 which, unlike shaft 70, of the embodiment of FIG. 2, is stationary. The ends of the shaft are threaded and carry threaded support members 184, 186 the former of which is provided with an extension 188 of insulating material. Ball bearing assemblies 190 are mounted in central, annular recesses in the outer surface of members 184, 186. At spaced intervals, the ball bearing assemblies mount radial tabs to which double arms 194 are pivotally connected.

The outer ends of arms 194 are pivoted to a plurality of spaced T bars 196. A shell 198 of sheet steel or similar structural material is wrapped about the outside of T bars 196 and secured by means of bolts 200 (FIG. 15). A layer 202 of soft asbestos or similar material is superimposed over sheet 198. Then a sheet 204 of hard asbestos or similar material is placed over layer 202, the latter two layers being secured by means of bolts 205.

Figure 4:
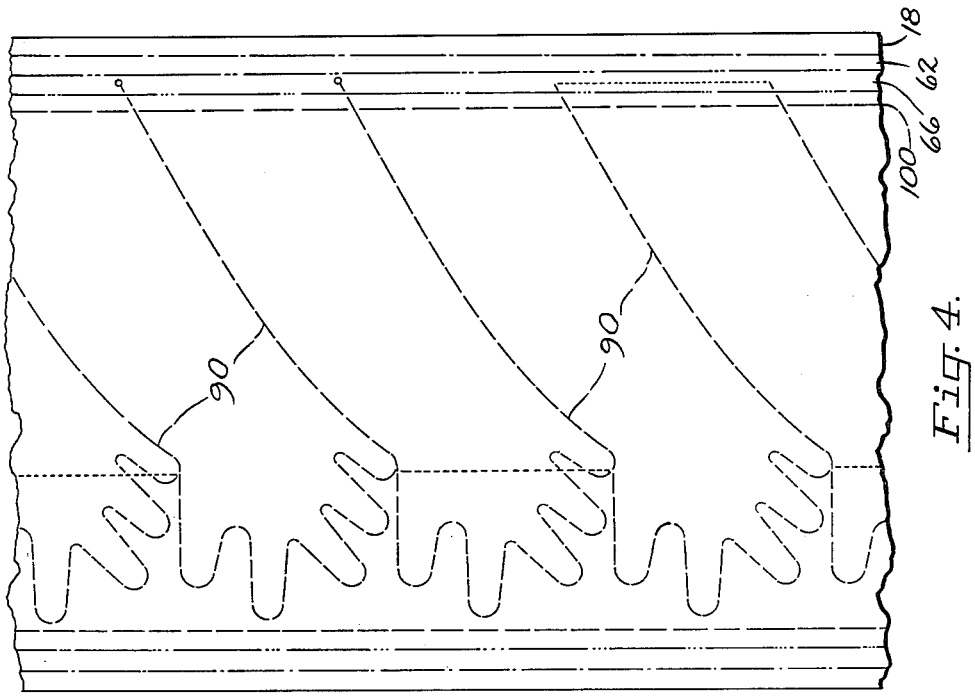
FIG. 4 is a schematic plan view illustrating the manner in which overlying sheets or tubes of plastic material are formed into finished articles by the apparatus of FIGS. 1–3.

The outer surface of sheet 204 bears a pattern of electric wires 206 which serve a plastic cutting and sealing function, in the same manner as do wires 90 of FIG. 4 and 136 of FIG. 9. They are maintained in position by means of fasteners 208, the ends of which are embedded in the layer 202 of soft sheet material.

Current is supplied to wires 206 through leads 210 which are housed in stationary shaft 182 and which are connected to slip rings 212. Brushes 214 contact the slip rings and supply current to wires 206 which form the cutting and sealing pattern on the outside of the cylinder.

A stripping means is illustrated in FIGS. 13–15 for stripping the finished articles from the surface of the die roll. It is mounted on a pair of standards 220 which are rigid to shaft 182. Slotted extensions 222 of the standards are adjustably secured thereto by means of bolts 224. They support a stationary tube 226 having closed ends and provided with a plurality of spaced, radially extending jets 228. The latter are directed toward the discharge side of the roll.

Compressed air is supplied to the jets through tube 230. Hence as the roll rotates about tube 226, the air jets blow through a plurality of spaced openings 232 in the roll when the latter come into registration with them, stripping off the plastic from the roll surface.

The manner of operation of the apparatus of FIGS. 13–15 is as follows:

First, threaded support members 184, 186 are adjusted to a position at which the roll diameter provides a circumference of the magnitude required to accommodate a given pattern of resistance wires 206. Shells 198, 202 and 204 cut to a corresponding size are mounted on T bars 196. Wires 206 are fastened on the outer shell in the desired pattern with fasteners 208.

Overlying sheets of plastic material, with or without a paper backing sheet, are passed about the roll in the manner indicated in FIG. 1, employing a drive belt similar to drive belt 18 of that figure. Frictional engagement of the belt with the roll through the plastic and paper layers causes rotation of the roll so that resistance wires 206 sever and seal the plastic in the desired manner. Air jets 228 then strip the finished articles from the surface of the roll.

Thus it will be apparent that by the present invention, I have provided method and apparatus for cutting and sealing overlying sheets of material, fashioning them into articles of diverse shapes and sizes. The cutting and sealing functions of the apparatus are performed in a single operation, at a high production rate. The apparatus automatically aligns printed matter on the sheet material to be sealed so that the material is cut accurately with reference thereto. Furthermore, the articles may be formed, the trimmings removed, and the articles either rolled or stacked for further processing or storage, in a single, continuous operation.

This application is a division of my copending application, Serial No. 729,350, filed April 18, 1958, for Forming Edge-United Laminar Articles, now abandoned.

It is to be understood that the forms of my invention, herein shown and described, are to be taken as preferred examples of the same and that various changes in the shape, size and arrangement of parts may be resorted to without departing from the spirit of my invention or the scope of the subjoined claims.

Having thus described my invention, I claim:

1. Apparatus for continuously forming edge-united laminar plastic articles which comprises:
   a rotatably mounted cylindrical die having a heat-resisting outer surface with heated electrodes in the form of electric resistance wires disposed in parallel slots extending longitudinally of the die;
   means for extending and retracting selected ones of the wires as required;
   a continuous flexible belt having a travel circumferentially around a substantial portion of the peripheral surface of said die;
   means for driving said belt and die;
   and means for feeding overlying heat-alterable plastic sheets under tension between said die and belt, said selected wires operating against said belt to seal and sever the sheets simultaneously in the configuration defined by said selected wires with said belt holding said sealed and severed articles to the periphery of said die out of contact with said wires until the welded seal is established.

2. The apparatus of claim 1 wherein the means for extending the electric resistance wires comprises solenoid-operated toggle means.

3. The apparatus of claim 1 wherein the means for retracting the wires comprises cam-operated toggle means.

4. The apparatus of claim 1 wherein the thermoplastic sheets have printed thereon and including electric eye means for scanning the sheets as they traverse the die, the electric eye means being coordinated with the extending and retracting means for extending a selected electric resistance wire at a time determined by the location of the insignia on the sheets.

5. For use in edge-uniting overlying thermoplastic sheets, a die comprising a rotatable cylinder having in its peripheral surface a plurality of spaced longitudinal slots, a plurality of electric resistance wires in a common electric circuit and contained one in each of the slots, and means for extending and retracting selected ones of the wires between operative positions wherein they are extended outside the slots and inoperative positions wherein they are withdrawn into the slots.

6. In an apparatus for continuously forming edge-united laminar articles, the combination of:
   a continuous flexible backing belt;
   means for superimposing a plurality of layers of heat-alterable plastic sheet material on said belt;
   means for placing the sheet material under tension;
   a plurality of electric resistance wires supported below a cylindrical surface in alignment with the axis of said surface;
   means for extending and retracting selected ones of said wires to provide a predetermined spacing between the extended wires;
   means for rotating said cylindrical surface;
   and means for wrapping said belt and sheet material around a major portion of said surface for pressing said material between said belt and surface continuously throughout said major portion and heat sealing the material in contact with the extended wires.

7. In an apparatus for continuously forming edge-united laminar articles, the combination of:
   an endless flexible backing belt;
   a rotating cylindrical structure;
   a plurality of electric resistance wires supported below the surface of said structure;
   means for extending and retracting selected ones of said wires;
   and means for wrapping said belt and a plurality of layers of heat-alterable plastic webs around a major portion of the surface of said structure and pressing said webs into engagement with said surface continuously throughout said major portion for advancing said belt, webs and surface together, and heat sealing the webs at the contact with the extended wires.

References Cited in the file of this patent

UNITED STATES PATENTS

| | | |
|---|---|---|
| 2,185,647 | Penn | Jan. 2, 1940 |
| 2,726,706 | Hakomaki | Dec. 13, 1955 |